United States Patent
Lavoie et al.

(10) Patent No.: US 10,331,125 B2
(45) Date of Patent: Jun. 25, 2019

(54) DETERMINATION OF VEHICLE VIEW BASED ON RELATIVE LOCATION

(71) Applicant: Ford Global Technologies, LLC, Dearborn, MI (US)

(72) Inventors: Erick Michael Lavoie, Dearborn, MI (US); John Robert Van Wiemeersch, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/615,605

(22) Filed: Jun. 6, 2017

(65) Prior Publication Data

US 2018/0348749 A1 Dec. 6, 2018

(51) Int. Cl.
 *G05D 1/03* (2006.01)
 *G06K 9/00* (2006.01)
 *G05D 1/00* (2006.01)

(52) U.S. Cl.
 CPC ....... *G05D 1/0038* (2013.01); *G06K 9/00805* (2013.01)

(58) Field of Classification Search
 CPC .......... G05D 1/0038; G06K 9/00805
 See application file for complete search history.

(56) References Cited

U.S. PATENT DOCUMENTS

| | | | |
|---|---|---|---|
| 7,227,474 B2 | 6/2007 | Zoratti | |
| 7,609,149 B2 | 10/2009 | Li | |
| 8,077,011 B2 | 12/2011 | McBride | |
| 9,008,917 B2 | 4/2015 | Gautama | |
| 9,156,496 B2 | 10/2015 | Greenwood et al. | |
| 9,607,460 B2 | 3/2017 | Yamane | |
| 9,858,817 B1 | 1/2018 | Bletzer et al. | |
| 9,884,590 B2* | 2/2018 | Park ........................ | H04N 7/181 |
| 9,963,107 B2 | 5/2018 | Murar | |
| 2004/0104815 A1 | 6/2004 | Suyama | |
| 2006/0046684 A1 | 3/2006 | Kameyama | |
| 2007/0030136 A1 | 2/2007 | Teshima | |
| 2007/0040649 A1 | 2/2007 | Dulgerian | |

(Continued)

FOREIGN PATENT DOCUMENTS

| | | |
|---|---|---|
| DE | 102010051205 A1 | 5/2012 |
| EP | 2384936 A1 | 11/2011 |

(Continued)

OTHER PUBLICATIONS

Smart Enhanced Back-Up Camera (SMARTEBC) for CV220X Image Cognition Processors, Tina Jeffrey.

(Continued)

*Primary Examiner* — Tyler J Lee (74) *Attorney, Agent, or Firm* — Frank Lollo; Neal, Gerber & Eisenberg LLP; James P. Muraff (57) ABSTRACT

Methods and systems are disclosed for determining a vehicle view based on a relative location of a remote display. An example vehicle includes a plurality of cameras configured to capture images of the vehicle surroundings. The vehicle also includes a communication system, and a processor. The processor is configured to stitch together images captured by the plurality of cameras, determine a relative location of a remote display with respect to the vehicle, determine a vehicle view based on the determined relative location, and transmit the vehicle view to the remote display.

20 Claims, 5 Drawing Sheets

(56) References Cited

U.S. PATENT DOCUMENTS

| | | |
|---|---|---|
| 2007/0109093 A1 | 5/2007 | Matsubara |
| 2007/0165967 A1 | 7/2007 | Ando |
| 2007/0200672 A1 | 8/2007 | McBride |
| 2008/0012940 A1* | 1/2008 | Kanaoka ............... H04N 5/272 348/148 |
| 2009/0243796 A1 | 10/2009 | Tieman |
| 2010/0191392 A1 | 7/2010 | Juzswik |
| 2012/0056734 A1 | 3/2012 | Ikeda et al. |
| 2013/0083061 A1* | 4/2013 | Mishra ................... H04N 5/265 345/633 |
| 2013/0090783 A1 | 4/2013 | Katou |
| 2013/0311001 A1 | 11/2013 | Hampiholi |
| 2013/0332004 A1* | 12/2013 | Gompert ............... G07C 5/008 701/1 |
| 2014/0253287 A1 | 9/2014 | Bauman |
| 2014/0253288 A1 | 9/2014 | O'Brien |
| 2014/0277935 A1 | 9/2014 | Daman |
| 2015/0109444 A1 | 4/2015 | Zhang et al. |
| 2015/0120151 A1 | 4/2015 | Akay |
| 2015/0161834 A1 | 6/2015 | Spahl |
| 2015/0325066 A1 | 11/2015 | Muller |
| 2016/0066254 A1 | 3/2016 | Colby |
| 2016/0090039 A1* | 3/2016 | Tan .................... G06K 9/00791 348/148 |
| 2016/0096466 A1 | 4/2016 | Okumura |
| 2016/0096476 A1 | 4/2016 | Fairchild |
| 2016/0127693 A1 | 5/2016 | Chung |
| 2016/0217638 A1 | 7/2016 | Child |
| 2016/0332574 A1* | 11/2016 | Park ....................... H04N 7/181 |
| 2017/0237945 A1 | 8/2017 | Murar |
| 2017/0293809 A1* | 10/2017 | Thompson ......... G06K 9/00832 |
| 2018/0012082 A1* | 1/2018 | Satazoda ............ G06K 9/00805 |
| 2018/0029538 A1 | 2/2018 | Matsushita |
| 2018/0053416 A1 | 2/2018 | Sanji |
| 2018/0204072 A1* | 7/2018 | Al Rasheed ....... G06K 9/00805 |
| 2018/0312022 A1* | 11/2018 | Mattern ............. B62D 15/0285 |

FOREIGN PATENT DOCUMENTS

| | | |
|---|---|---|
| EP | 2637897 B1 | 10/2016 |
| GB | 2463544 A | 3/2010 |
| GB | 2554797 A | 4/2018 |

OTHER PUBLICATIONS

The Car With Infrared Headlights: Ford Develops Smart Lights to Detect Pedestrians, Cyclists and Animals at Night, Richard Gray, Jul. 21, 2015.

Search Report dated Apr. 19, 2018 for GB Patent Application No. GB 1718573.7 (3 Pages).

Search Report dated Nov. 14, 2018 for GB Patent Application No. GB 1809116.5 (4 pages).

* cited by examiner

DETERMINATION OF VEHICLE VIEW BASED ON RELATIVE LOCATION

TECHNICAL FIELD

The present disclosure generally relates to vehicle imaging, and, more specifically, determining and remotely displaying a vehicle view based on a determined relative location.

BACKGROUND

Modern vehicles may include one or more cameras configured to capture views from the perspective of the vehicle. These views can be used for automatic navigation and vehicle control, as well as for safety purposes such providing a driver with a "backup" camera.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for determining and transmitting a vehicle view to a remote display, based on a relative location of the remote display. An example disclosed vehicle includes a plurality of cameras configured to capture images of the vehicle surroundings, a communication system, and a processor. The processor is configured to stitch together images captured by the plurality of cameras. The processor is also configured to determine a relative location of a remote display with respect to the vehicle. The processor is further configured to determine a vehicle view based on the determined relative location, and transmit the vehicle view to the remote display.

An example disclosed method includes capturing, by a plurality of cameras, images of a vehicle surroundings. The method also includes stitching together images captured by the plurality of cameras. The method further includes determining a relative location of a remote display with respect to the vehicle. The method still further includes determining a vehicle view based on the determined relative location, and transmitting the vehicle view to the remote display for display to a user.

Another example may include means for capturing, by a plurality of cameras, images of a vehicle surroundings. The example may also include means for stitching together images captured by the plurality of cameras. The example may further include means for determining a relative location of a remote display with respect to the vehicle. The example still further may includes means for determining a vehicle view based on the determined relative location, and means for transmitting the vehicle view to the remote display for display to a user.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, modern vehicles may include one or more cameras configured to capture images from the perspective of the vehicle. These images may be used for navigational purposes, steering, and automatic control of the vehicle. Some vehicles may also include features such as remote parking assist and remote trailer backup assist, which enable a vehicle to autonomously carry out one or more movements. The driver may even be outside the vehicle during these movements.

In some scenarios, a vehicle may be parked outside in a parking lot. IF a driver approaches the vehicle, he or she may wish to view the surroundings of the vehicle to see whether any persons or objects are nearby, possibly hidden on a far side of the vehicle.

For both the purpose of remote movement of the vehicle, and based on safety concerns, it may be beneficial to provide a driver of the vehicle with a remote display a vehicle view of the far side or hidden side of the vehicle. This may allow the driver to "see through" the vehicle to determine whether any objects or persons are present. Further, examples herein may provide images to the remote display along with warnings or alerts that may show changes in the various objects in the image, such as a flashing alert when a person approaches the vehicle.

In some examples disclosed herein, a vehicle may include a plurality of cameras configured to capture images of the vehicle surroundings. These cameras may be positioned and/or aimed such that a full 360 degree view is captured. In addition, the cameras may be configured to capture images at all times, or only during specific instances, such as during a remote parking assist operation or remote trailer backup assist operation.

The example vehicle may also include a communication system. The communication system may be coupled with a vehicle processor, and may be configured to transmit and/or receive data from a remote display. The remote display may be a smart phone, tablet, or other mobile device configured to display one or more images.

The vehicle processor may be configured to carry out one or more actions. For instance, the processor may stitch together images captured by the plurality of cameras. This may enable a full image of the vehicle surroundings to be displayed, and/or one portion of the vehicle surroundings. The processor may also be configured to determine a relative location of the remote display with respect to the vehicle. This may be accomplished through the use of the communication system, by using one or more antennas located in various locations inside and/or outside the vehicle.

The processor may also be configured to determine a vehicle view based on the determined relative location. A vehicle view may comprise an image, a plurality of images, and/or a combination of parts of a plurality of images captured by the vehicle cameras, showing a view from the perspective of the vehicle. The vehicle view may be determined based on the relative location of the remote display be selecting one or more images from a side of the vehicle opposite the remote display, such that the remote display can "see through" the vehicle.

The processor may also be configured to transmit the determined vehicle view to the remote display.

Further, as the vehicle moves during a remote vehicle movement operation, the processor may update the relative location and the determined vehicle view, and transmit the updated vehicle view to the remote display. In addition, the remote display (via a user) may change its location with respect to the vehicle. In this case, the processor may update the relative location and vehicle view, and transmit the updated vehicle view to the display.

In some examples, the processor may also be configured to predict a movement of the vehicle, and correspondingly bias or modify the vehicle view. For instance, a vehicle may be commanded to execute a remote parking assist operation, in which the vehicle must reverse into a parking space. If the remote display is initially located near the driver's side of the vehicle, a corresponding vehicle view may show the right side of the vehicle. Then, as the vehicle reverses, the corresponding vehicle view may accordingly rotate to show a view more toward the rear of the vehicle. But if the vehicle predicts the vehicle movement, the processor may bias or modify the vehicle view to show a greater proportion of the rear view than would otherwise be shown. This may provide added safety by allowing a user of the remote display to better see objects in the path of the vehicle while it moves.

And further, the processor may be configured to detect one or more features present in the vehicle view, and provide an alert to the remote display. These features may include people, pets, toys, other vehicles, and/or structures, for example.

Figure 1:
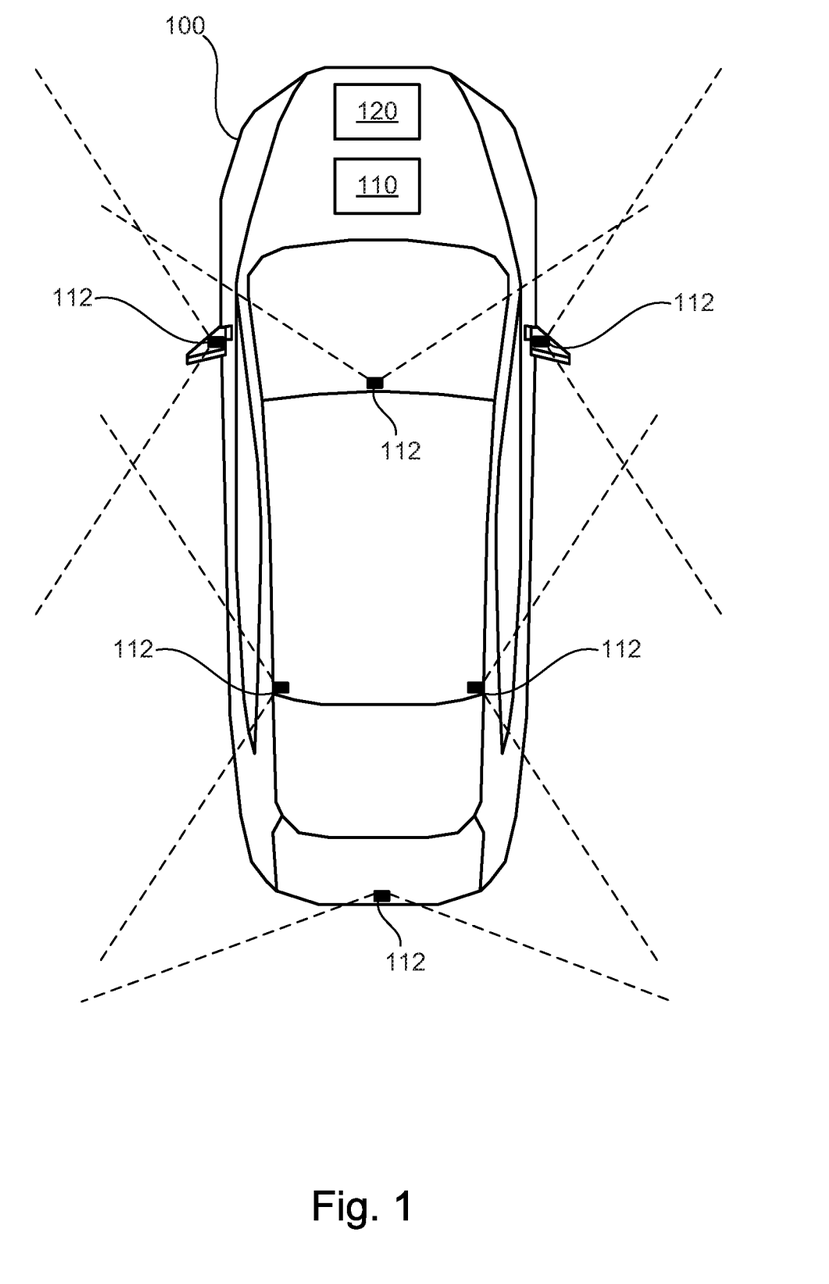
FIG. 1 illustrates an example vehicle according to embodiments of the present disclosure.

FIG. 1 illustrates an example vehicle 100 according to embodiments of the present disclosure. Vehicle 100 may be a standard gasoline powered vehicle, a hybrid vehicle, an electric vehicle, a fuel cell vehicle, and/or any other mobility implement type of vehicle. Vehicle 100 may include parts related to mobility, such as a powertrain with an engine, a transmission, a suspension, a driveshaft, and/or wheels, etc. Vehicle 100 may be non-autonomous, semi-autonomous (e.g., some routine motive functions controlled by the vehicle 100), or autonomous (e.g., motive functions are controlled by vehicle 100 without direct driver input). Vehicle 100 may include one or more components described below with respect to FIG. 2.

In FIG. 1, vehicle 100 is shown having a processor 110, a communication system 120, and a plurality of cameras 112. FIG. 1 illustrates vehicle 100 having six cameras, however it should be noted that fewer or more cameras may be included.

Processor 110 may be configured to perform one or more functions such as those described herein. And communication system 120 may also be configured to carry out one or more functions.

Cameras 112 may be located inside or outside vehicle 100. And each camera may have a particular field of view, which may or may not overlap with one or more other cameras. In some examples, cameras 112 may be positioned and/or aimed such that the combined field of view provides full 360 degree coverage.

Figure 2:
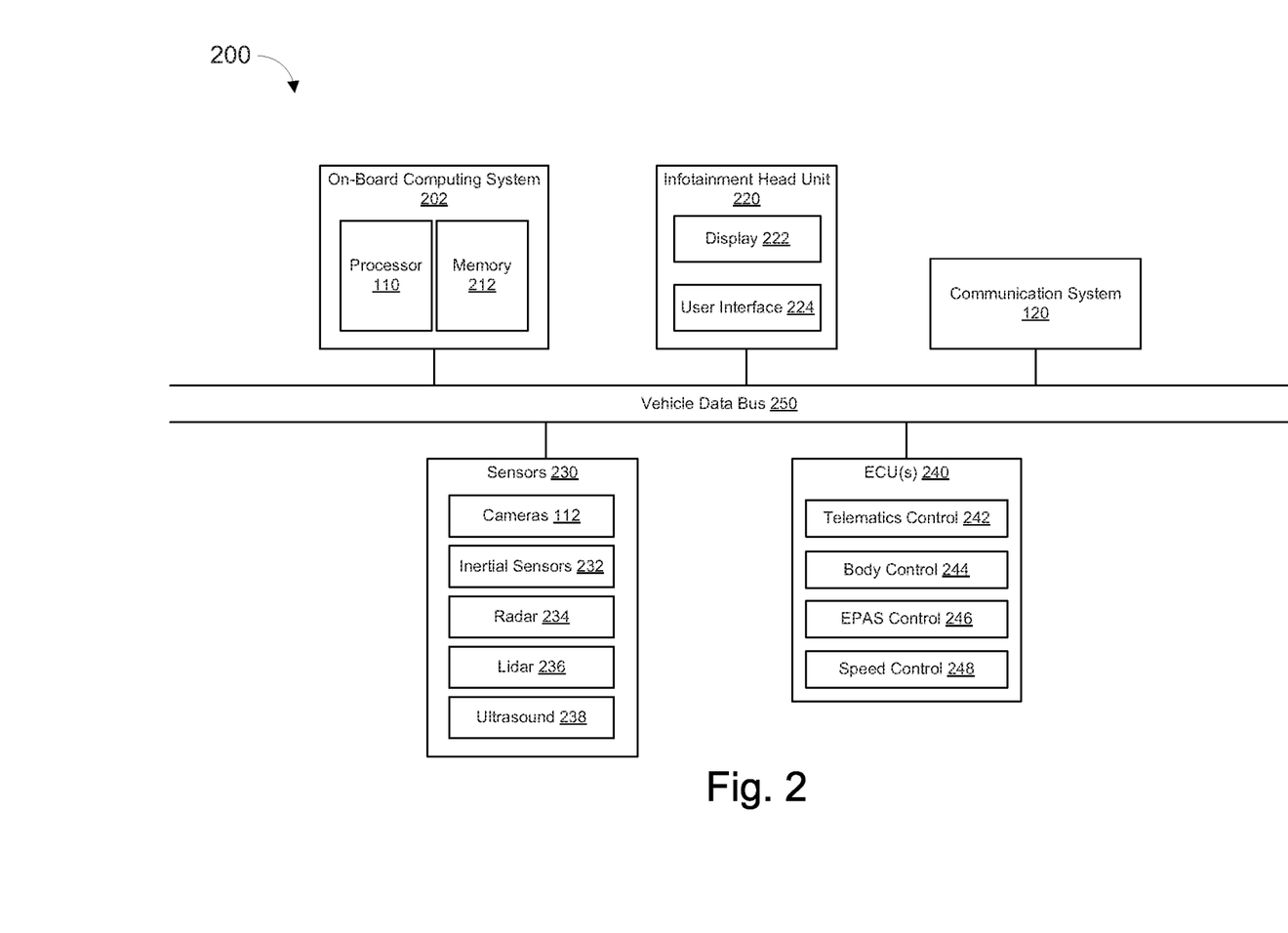
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include an on-board computing system 202, infotainment head unit 220, communication system 120, sensors 230, electronic control unit(s) 240, and vehicle data bus 250.

The on-board computing system 202 may include a microcontroller unit, controller or processor 110 and memory 212. The processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor and/or memory with on-board computing system 202. Additionally, the infotainment head unit 220 may display the infotainment system on, for example, a center console display of vehicle 100.

Communication system 120 may include wired or wireless network interfaces to enable communication with external networks, devices, or systems. Communication system 120 may also include hardware (e.g., processors, memory, storage, antenna, etc.) and software to control the wired or wireless network interfaces. In the illustrated example, communication system 120 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, communication system 120 may include a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

Sensors 230 may be arranged in and around vehicle 100 to monitor properties of vehicle 100 and/or an environment in which vehicle 100 is located. One or more of sensors 230 may be mounted on the outside of vehicle 100 to measure properties around an exterior of the vehicle 100. For instance, one or more antennas may be positions around an outside of vehicle 100 in order to receive signals from one or more devices and to determine a location of the device. Additionally or alternatively, one or more of sensors 230 may be mounted inside a cabin of vehicle 100 or in a body of vehicle 100 (e.g., an engine compartment, wheel wells, etc.) to measure properties in an interior of the vehicle 100. For example, sensors 230 may include accelerometers, odometers, tachometers, pitch and yaw sensors, wheel speed sensors, microphones, tire pressure sensors, biometric sensors and/or sensors of any other suitable type.

In some examples, sensors 230 may include one or more cameras 112, inertial sensors 232, RADAR 234, LIDAR 236, and ultrasound 238. In some examples, the inertial sensors may be used to determine a change in position of the vehicle, which may in turn be used to determine or modify the relative location of a remote display with respect to the vehicle. Further, the inertial sensors may be used to determine or predict a movement of the vehicle, such as during a remote vehicle movement operation, so as to bias the vehicle view transmitted to the remote display. The RADAR 234, LIDAR 236, and ultrasound 238 sensors may detect one or more objects, structures, or other features surrounding the vehicle, which may enable the processor to transmit an alert to the remote display.

The ECUs 240 may monitor and control subsystems of vehicle 100. Additionally, ECUs 240 may communicate properties (such as, status of the ECU 240, sensor readings, control state, error and diagnostic codes, etc.) to and/or receive requests from other ECUs 240, on-board computing platform 202, and/or processor 110. Some vehicles 100 may have seventy or more ECUs 240 located in various locations around the vehicle 100 communicatively coupled by vehicle data bus 250. ECUs 240 may be discrete sets of electronics that include their own circuit(s) (such as integrated circuits, microprocessors, memory, storage, etc.) and firmware, sensors, actuators, and/or mounting hardware. In the illustrated example, ECUs 240 may include the telematics control unit 242, the body control unit 244, the electronic power assisted steering (EPAS) control unit 246, and the speed control unit 248.

The telematics control unit 242 may control tracking of the vehicle 100, for example, using data received by a GPS receiver, communication system 120, and/or one or more sensors 230. The body control unit 244 may control various subsystems of the vehicle 100. For example, the body control unit 244 may control power a trunk latch, windows, power locks, power moon roof control, an immobilizer system, and/or power mirrors, etc. The EPAS control unit 246 may transmit and receive one or more signals via data bus 250 corresponding to steering information, such as the heading of the vehicle. The speed control unit 248 may transmit and receive one or more signals via data bus 250, and may responsively control a speed, acceleration, or other aspect of vehicle 100.

Vehicle data bus 250 may include one or more data buses that communicatively couple the on-board computing system 202, infotainment head unit 220, communication system 120, sensors 230, ECUs 240, and other devices or systems connected to the vehicle data bus 250. In some examples, vehicle data bus 250 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7).

Figure 3A:
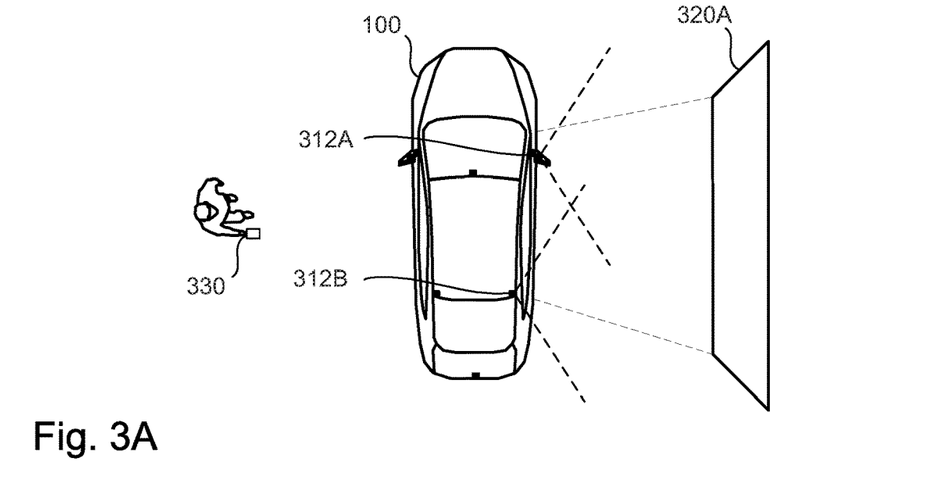
FIGS. 3A and 3B illustrate first and second vehicle positions with respect to a remote display, according to embodiments of the present disclosure.
Figure 3B:
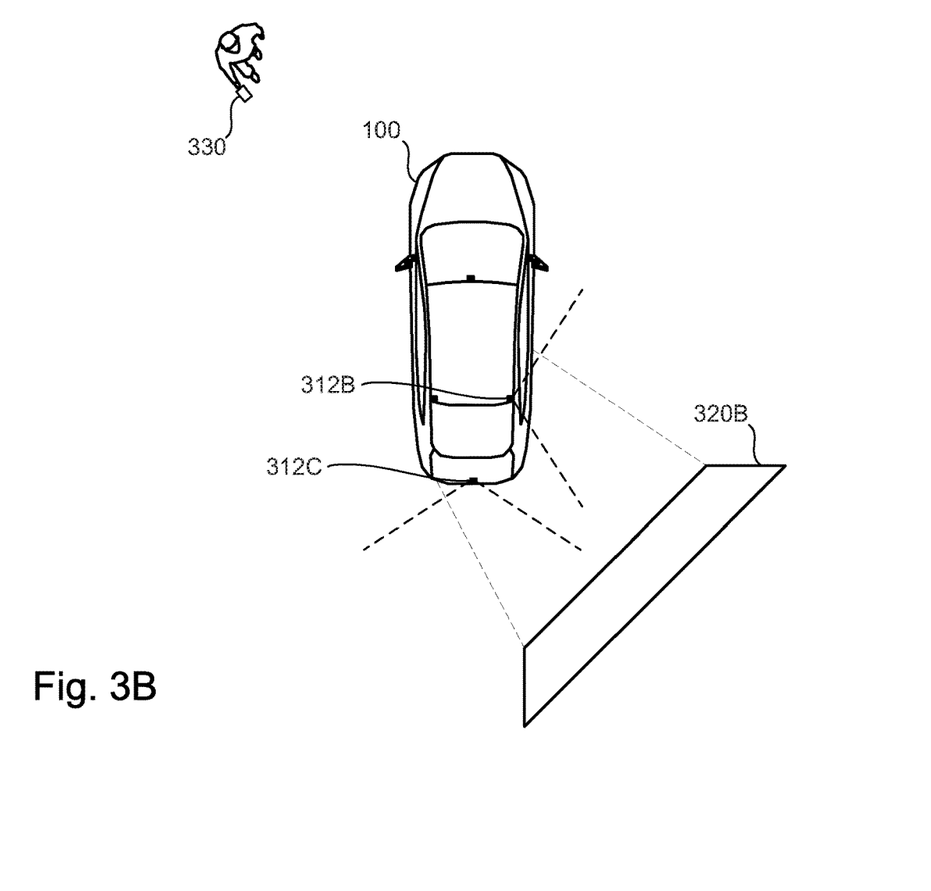

FIGS. 3A and 3B illustrate first and second vehicle positions with respect to remote display 330, according to embodiments of the present disclosure. In FIG. 3A, vehicle 100 is directly to a right side of the remote display 330. Vehicle 100 includes a plurality of cameras configured to captures surroundings of vehicle 100. In particular, cameras 312A and 312B capture respective fields of view.

The processor of vehicle 100 may determine the relative position of remote display 330, using, for example, a communication system comprising one or more antennas. In FIG. 3A, the processor determines that the relative position of the remote display 330 is to a left side of vehicle 100. And responsively, the processor may take images captured by cameras on the opposite (right) side of vehicle 100 to determine a vehicle view 320A.

The vehicle view 320A corresponds to a combination of images captured by cameras 312A and 312B. In some examples, the vehicle view may be determined from images from a single camera, or from three or more. Further, vehicle view 320A is shown in FIG. 3A with a particular height and length with respect to vehicle 100. However in some examples, the height and width of the vehicle view 320A may be greater or smaller, and may depend on a distance between vehicle 100 and the remote device. For instance, a remote device closer to vehicle 100 may result in a greater width and/or length of the vehicle view, whereas a remote device farther away may have a smaller width and/or length.

FIG. 3B illustrates a second vehicle position with respect to the remote display 330. It may be understood that in FIGS. 3A and 3B, the remote device 330 has remained stationary while vehicle 100 has moved backward.

As can be seen in FIG. 3B, the processor has determined a second vehicle view 320B based on a combination of images from cameras 312B and 312C. The vehicle view 320B is again a view from the perspective of the vehicle opposite the location of the remote display 330. The vehicle processor may determine that the vehicle has moved, and/or that a relative location of the remote display with respect to the vehicle has changed based on one or more vehicle sensors (e.g., inertial sensors), and/or based on a communication between the vehicle and the remote display. In response, the processor may be configured to modify the vehicle view as shown in FIG. 3B, such as by rotating the view around vehicle 100, changing the camera image used or combination of camera images, or otherwise modifying the vehicle view.

Figure 4A:
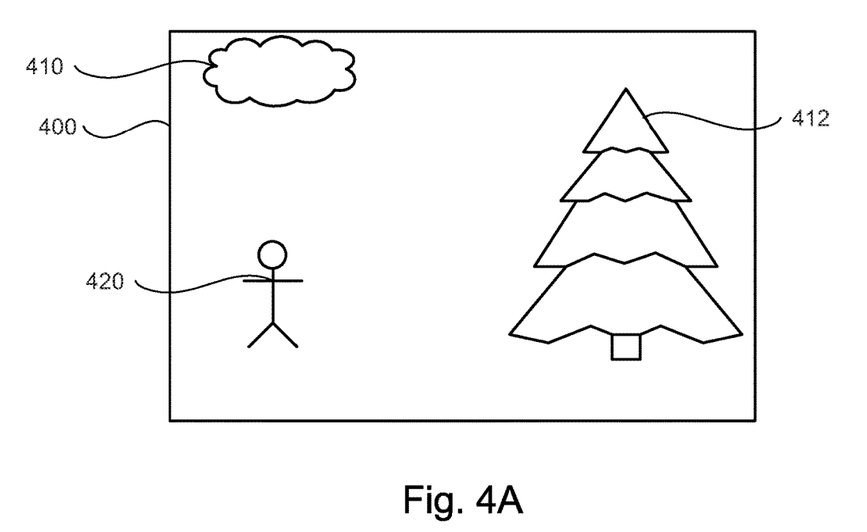
FIGS. 4A and 4B illustrate two example images displayed on a remote display according to embodiments of the present disclosure.
Figure 4B:
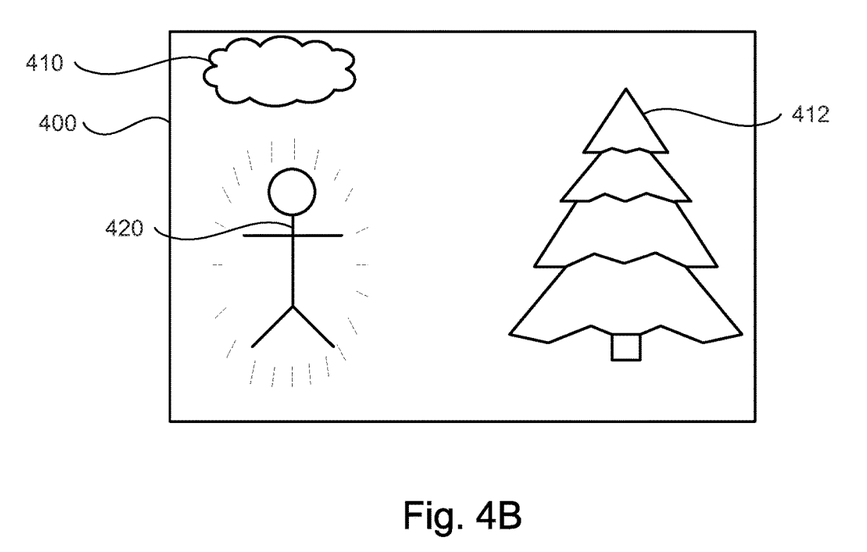

FIGS. 4A and 4B illustrate example vehicle views displayed on a remote display 400. The processor of the vehicle may be configured to transmit the vehicle view to the remote display for display to a user. Further, the processor may be configured to detect one or more features in the vehicle view, and provide an alert to the remote display. The one or more features may be detected by the various vehicle sensors, including the RADAR, LIDAR, and ultrasound sensors.

In FIG. 4A, the vehicle view includes features 410, 412 and 420. Features 410 and 412 may be determined to be inanimate objects. And feature 420 may be determined to be a person. The processor may be configured to provide an alert or warning to the remote display based on the detection of a person.

FIG. 4B illustrates a second vehicle view, in which the person, feature 420, has approached the vehicle. The processor may be configured to provide an alert or warning indicating that the person is approaching the vehicle. This may include a visual or audio alert, such as a flashing outline of the person. In some examples, the flashing may increase in frequency as the person approaches, or may change color (e.g., from green to yellow, to red) based on a determined distance or rate of approach of the person 420.

In some examples, the processor may also be configured to recognize one or more trusted objects. For instance, the vehicle may include one or more antennas or other sensors configured to detect a key fob. If a person, such as person 420, possesses the key fob for the vehicle, the processor may not transmit an alert. Alternatively, the processor may transmit an alert indicating that the person is trusted.

Figure 5:
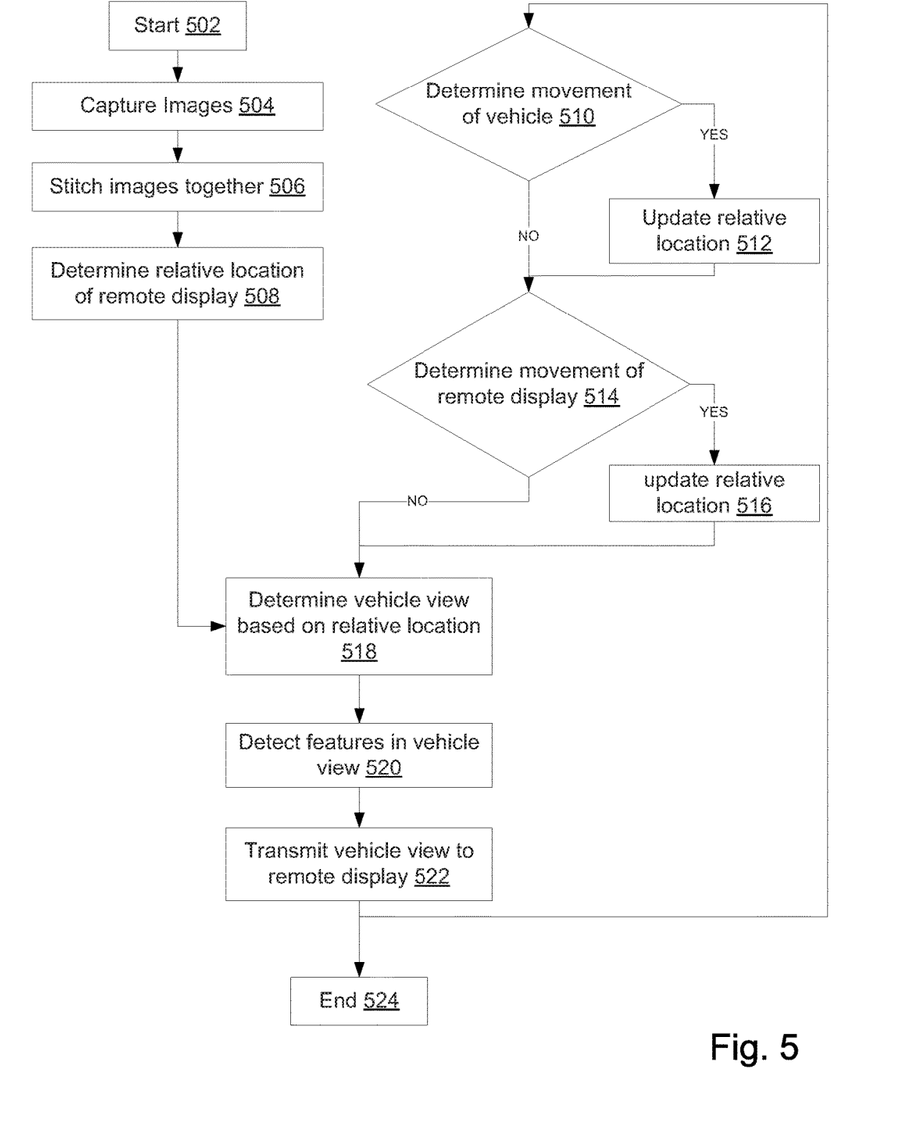
FIG. 5 illustrates a flowchart of an example method according to embodiments of the present disclosure

FIG. 5 illustrates a flowchart of an example method 500 according to embodiments of the present disclosure. Method 500 may determine and transmit to a remote display a vehicle view based on a relative location of the remote display with respect to the vehicle. The flowchart of FIG. 5 is representative of machine readable instructions that are stored in memory (such as memory 212) and may include one or more programs which, when executed by a processor (such as processor 110) may cause vehicle 100 to carry out one or more functions described herein. While the example program is described with reference to the flowchart illustrated in FIG. 5, many other methods for carrying out the functions described herein may alternatively be used. For example, the order of execution of the blocks may be rearranged, blocks may be changed, eliminated, and/or combined to perform method 600. Further, because method 500 is disclosed in connection with the components of FIGS. 1-4, some functions of those components will not be described in detail below.

Method 500 may start at block 502. At block 504, method 500 may include capturing images. The images may be captured by a plurality of cameras positioned around the vehicle.

At block 506, method 500 may include stitching the images together. The images may be stitched together to produce a full 360 degree view from the perspective of the vehicle. This may allow the vehicle view to be in any direction. Stitching the images together may also include selecting a subset of images to stitch together, rather than all images captured by the cameras.

At block 508, method 500 may include determining a relative location of a remote display with respect to the vehicle. Determining the relative location may include using one or more antennas, such as Bluetooth Low Energy (BLE) antennas, to triangulate or otherwise determine the position of the remote display. In some examples, the relative location may be determined with respect to a center of the vehicle.

Method 500 may then proceed to block 518, which includes determining a vehicle view based on the relative location. The vehicle view comprised from one or more images captured by camera(s) on the opposite side of the vehicle from the location of the remote display. In some examples, the vehicle view may be determined with a particular width and length based on a distance between the remote display and the vehicle. Other factors may affect the vehicle view as well.

At block 520, method 500 may include detecting features in the vehicle view. This may include detecting people, objects, structures, and more. This may also include generating an alert, which may be visual or audio, to correspond to a particular feature.

At block 522, method 500 may include transmitting the vehicle view to the remote display. This may also include transmitting one or more alerts or warnings corresponding to features detected in block 520.

Method 500 may then proceed to block 510, which includes determining a movement of the vehicle. Vehicle movement may be determined based on one or more inertial sensors, GPS sensors, or other vehicle sensors. Based on a determined movement of the vehicle, method 500 may include updating the relative location at block 512.

Block 514 may include determining a movement of the remote display. This may include determining a change in position of the remote display based on one or more antennas or other vehicle sensors. Method 500 may then include updating the relative location at block 516.

Method 500 may then include determining an updated vehicle view at block 518, detecting features in the updated vehicle view at block 520, and transmitting the updated vehicle view to the remote display at block 522. Blocks 510-522 may be repeated to update the vehicle view as the vehicle and/or remote display move. Method 500 may then end at block 524.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a plurality of cameras configured to capture images of a vehicle surroundings;
   a communication system wirelessly coupled to a remote display; and
   processor configured to:
      stitch together the images;
      determine, via the communication system, a relative location of the remote display with respect to the vehicle;
      determine a vehicle view based on the stitched images and the determined relative location; and
      transmit the vehicle view to the remote display.

2. The vehicle of claim 1, wherein the plurality of cameras are positioned such that a 360 degree view of the vehicle surroundings is captured.

3. The vehicle of claim 1, wherein the processor is further configured to determine the relative location of the remote display using one or more Bluetooth® Low Energy (BLE) antennas.

4. The vehicle of claim 1, wherein the vehicle view is a view from the vehicle opposite the determined relative location.

5. The vehicle of claim 1, wherein the vehicle view comprises a combination of images from two or more of the plurality of cameras.

6. The vehicle of claim 1, wherein the remote display comprises a screen of a mobile device.

7. The vehicle of claim 1, wherein the images of the vehicle surroundings are captured while a remote vehicle movement operation occurs.

8. The vehicle of claim 1, wherein the processor is further configured to modify the vehicle view based on (i) a change in a location of the vehicle and (ii) a change in the relative location of the remote display with respect to the vehicle.

9. The vehicle of claim 1, wherein the processor is further configured to detect one or more features in the vehicle view, and responsively provide an alert to the remote display.

10. The vehicle of claim 9, further comprising one or more vehicle sensors configured to detect the one or more features in the vehicle view, wherein the alert comprises a visual indication that a detected feature is approaching the vehicle.

11. The vehicle of claim 1, wherein the processor is further configured to predict a movement of the vehicle, and responsively modify the vehicle view transmitted to the display based on the predicted movement.

12. A method comprising:
    capturing, by a plurality of cameras, images of a vehicle surroundings;
    stitching together the images;
    determining, via a communication system of a vehicle, a relative location of a remote display with respect to the vehicle;
    determining a vehicle view based on the stitched images and the determined relative location; and
    transmitting the vehicle view to the remote display for display to a user.

13. The method of claim 12, wherein capturing the images of the vehicle surroundings comprises capturing a 360 degree view of the vehicle surroundings.

14. The method of claim 12, further comprising determining the relative location using one or more Bluetooth® Low Energy (BLE) antennas.

15. The method of claim 12, wherein the vehicle view is a view from the vehicle opposite the determined relative location.

16. The method of claim 12, further comprising performing a remote vehicle movement operation, wherein the images of the vehicle surroundings are captured while the remote vehicle movement operation occurs.

17. The method of claim 12, further comprising modifying the vehicle view based on (i) a change in a location of the vehicle and (ii) a change in the relative location of the remote display with respect to the vehicle.

18. The method of claim 12, further comprising detecting one or more features in the vehicle view, and responsively providing an alert to the remote display.

19. The method of claim 18, further comprising detecting the one or more features in the vehicle view using one or more vehicle sensors, wherein the alert comprises a visual indication that a detected feature is approaching the vehicle.

20. The method of claim 12, further comprising predicting a movement of the vehicle, and responsively modifying the vehicle view transmitted to the remote display based on the movement.

* * * * *